(12) United States Patent
Hemmett et al.

(10) Patent No.: US 8,683,409 B2
(45) Date of Patent: *Mar. 25, 2014

(54) PERFORMING STATISTICAL TIMING ANALYSIS WITH NON-SEPARABLE STATISTICAL AND DETERMINISTIC VARIATIONS

(71) Applicant: International Business Machines Corporation, Armonk, NY (US)

(72) Inventors: Jeffrey G. Hemmett, St. George, VT (US); Debjit Sinha, Wappingers Falls, NY (US); Natesan Venkateswaran, Hopewell Junction, NY (US); Chandramouli Visweswariah, Croton-on-Hudson, NY (US); Vladimir Zolotov, Putnam Valley, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/768,563

(22) Filed: Feb. 15, 2013

(65) Prior Publication Data
US 2013/0159953 A1 Jun. 20, 2013

Related U.S. Application Data

(63) Continuation of application No. 12/943,541, filed on Nov. 10, 2010, now Pat. No. 8,418,107.

(51) Int. Cl.
*G06F 9/455* (2006.01)
*G06F 17/50* (2006.01)

(52) U.S. Cl.
USPC ........... 716/113; 716/106; 716/108; 716/111; 716/112; 716/134; 703/19

(58) Field of Classification Search
USPC ................. 716/106, 108, 111, 112, 134, 113; 703/19
See application file for complete search history.

(56) References Cited

U.S. PATENT DOCUMENTS

| 7,117,466 B2 | 10/2006 | Kalafala et al. |
| 2006/0277513 A1 | 12/2006 | Visweswariah |

(Continued)

OTHER PUBLICATIONS

"Simulatenous Gate Sizing and Skew Scheduling to Statistical Yield Improvement", by Minoo Mirsaeedi, Morteza Saheb Zamani, and Mehdi Saeedi, @2008.*

(Continued)

*Primary Examiner* — Nha Nguyen
(74) *Attorney, Agent, or Firm* — Preston Young

(57) ABSTRACT

In one embodiment, the invention is a method and apparatus for performing statistical timing analysis with non-separable statistical and deterministic variations. One embodiment of a method for performing timing analysis of an integrated circuit chip includes computing delays and slews of chip gates and wires, wherein the delays and slews depend on at least a first process parameter that is deterministic and corner-based and a second process parameter that is statistical and non-separable with the first process parameter, and performing a single timing run using the timing quantity, wherein the single timing run produces arrival times, required arrival times, and timing slacks at outputs, latches, and circuit nodes of the integrated circuit chip. The computed arrival times, required arrival times, and timing slacks can be projected to a corner value of deterministic variations in order to obtain a statistical model of the delays and slews at the corresponding corner.

25 Claims, 8 Drawing Sheets

(56) References Cited

U.S. PATENT DOCUMENTS

| | | |
|---|---|---|
| 2007/0226660 A1* | 9/2007 | Ogawa .............................. 716/2 |
| 2007/0234253 A1 | 10/2007 | Soreff et al. |
| 2009/0241078 A1 | 9/2009 | Hemmett et al. |
| 2012/0117527 A1 | 5/2012 | Hemmett et al. |

OTHER PUBLICATIONS

"Simultaneous Gate Sizing and Skew Scheduling to Statistical Yield Improvement", by M. Mirsaeedi, M.S. Zamani, and M. Saeedi, @2008.

* cited by examiner

PERFORMING STATISTICAL TIMING ANALYSIS WITH NON-SEPARABLE STATISTICAL AND DETERMINISTIC VARIATIONS

CROSS REFERENCE TO RELATED APPLICATIONS

This application is a continuation of co-pending U.S. patent application Ser. No. 12/943,541, filed Nov. 10, 2010, which is herein incorporated by reference in its entirety.

BACKGROUND OF THE INVENTION

The present invention relates generally to design automation, and relates more particularly to the timing analysis of integrated circuit (IC) chips.

Manufacturing and environmental variations are unavoidable in integrated circuit (IC) chips. Delays and slews of signals propagated through logic gates and wires depend on these variations. Statistical timing is commonly used to analyze IC chips for timing violations in the range of these variations. Statistical timing assumes that manufacturing and environmental variations are random and therefore behave statistically. Applying this assumption, statistical timing analysis models chip timing statistically. It approximates timing accurately in the regions of highly probable values of variations while allowing higher error in the regions of less probable values of variations.

Conventionally, the delays of gates and wires in the chip are modeled in the linear canonical form of variational parameters, which is simple and efficient to propagate through the circuit. FIG. 1, for example, illustrates the conventional linear approach to modeling timing quantities in statistical timing. Specifically, FIG. 1 illustrates the delay D for an exemplary logic gate as a function of two sources of variation X and V. X and V in this case are linear, separable parameters. X and V may be set to any value within a range of values (i.e., $X_1$-$X_2$ and $V_1$-$V_2$, respectively). The delay is modeled in linear canonical form as $D(V,X)=d_0+d_v\Delta V+d_x\Delta X$. The delay sensitivities $d_x$ and $d_v$ are computed by finite differencing, as illustrated. The delay sensitivities can also be computed by differentiating the delays of gates and wires with respect to variational variables. In some cases, the sensitivities of delays and slews can be assigned (asserted) assuming a known percentage of variability, without requiring explicit finite differencing or computing of derivatives. A process "corner" occurs where a boundary (i.e., highest or lowest possible) value of X meets a boundary value of Y. As illustrated, the linear canonical form is an exact model of the delay for all process corners when dealing with linear separable parameters.

Some variables, however, are not separable and thus do not interact linearly. For example, chips are designed to operate correctly in a range of supply voltages (Vdd); a circuit using a chip can set the supply voltage to any value in this range. At different supply voltages, the sensitivities of delays and slews to some parameters will be different, because the variations due to these parameters and the supply voltage are not separable. FIG. 2 illustrates the application of the linear approach illustrated in FIG. 1 to modeling timing quantities with non-separable parameters X and V. As illustrated, the linear form cannot model the delay exactly when the delay is a function of non-separable parameters.

Moreover, variables like supply voltage are not statistical, but deterministic. Chips must work at any voltage within the required range of voltage values. All voltage values in this range are equally important, even the lowest and highest ("corner") values. The statistical approximation used by statistical timing analysis is not accurate enough to model variations of supply voltage or similar deterministic parameters. The statistical approximation cannot achieve sufficient accuracy near the corner values of the deterministic parameters, especially if some statistical parameters are not separable with the deterministic parameters.

Conventional statistical timing methodology therefore uses two timing runs at each voltage "corner" to account for these non-separable, non-statistical (deterministic) variations: a first timing run at a low supply voltage ($V_1$) and a second timing run at a high supply voltage ($V_2$). The use of multiple timing runs, however, is inefficient and inconvenient. For instance, timing closure will take longer and will require more computational resources. Additionally, a circuit optimized at one supply voltage will often fail at another supply voltage. This leads to multiple iterations in circuit design and optimization.

The deterministic variables requiring equally high accuracy of timing analysis across the entire range of variations including their corners are called "corner-based variables" due to the necessity of using corner analysis in their modeling.

SUMMARY OF THE INVENTION

In one embodiment, the invention is a method and apparatus for performing statistical timing analysis with non-separable statistical and deterministic variations. One embodiment of a method for performing timing analysis of an integrated circuit chip includes computing delays and slews of chip gates and wires, wherein the delays and slews depend on at least a first process parameter that is deterministic and corner-based and a second process parameter that is statistical and non-separable with the first process parameter, and performing a single timing run using the timing quantity, wherein the single timing run produces arrival times, required arrival times, and timing slacks at outputs, latches, and circuit nodes of the integrated circuit chip. The computed arrival times, required arrival times, and timing slacks can be projected to a corner value of deterministic variations in order to obtain a statistical model of the delays and slews at the corresponding corner.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the present invention is a method and apparatus for performing statistical timing analysis with non-separable statistical and deterministic variations. Embodiments of the invention extend the linear canonical forms of process parameters (variables) by including cross-terms that model the interaction of the non-separable statistical variables with deterministic corner-based variables. The extended canonical form models timing quantities as a function of separable and non-separable variations with a hyperbolic surface. The cross-terms for delays and slews of logic gates and wires can be computed by finite differencing to the corners involving variations of the deterministic corner-based and corresponding non-separable variables simultaneously. The variability of delays and slews can also be assigned to logic gates and wires without their explicit computation by applying known information about the amount of variability. Arrival times and required arrival times are propagated through a timing graph using extended versions of statistical operations: addition, subtraction, minimum, and maximum. The extended versions of the statistical operations are applied to extended canonical forms, and the result is also computed in extended canonical form. This approach is able to time circuits in a single timing run for both corners of a deterministic (corner-based) variable, and is thus faster and requires less memory than conventional techniques for performing statistical timing with non-separable variables. Moreover, this approach can be applied to substantially any design automation process that utilizes statistical timing, including sign-off timing, circuit optimization, and selective voltage binning.

Figure 1:
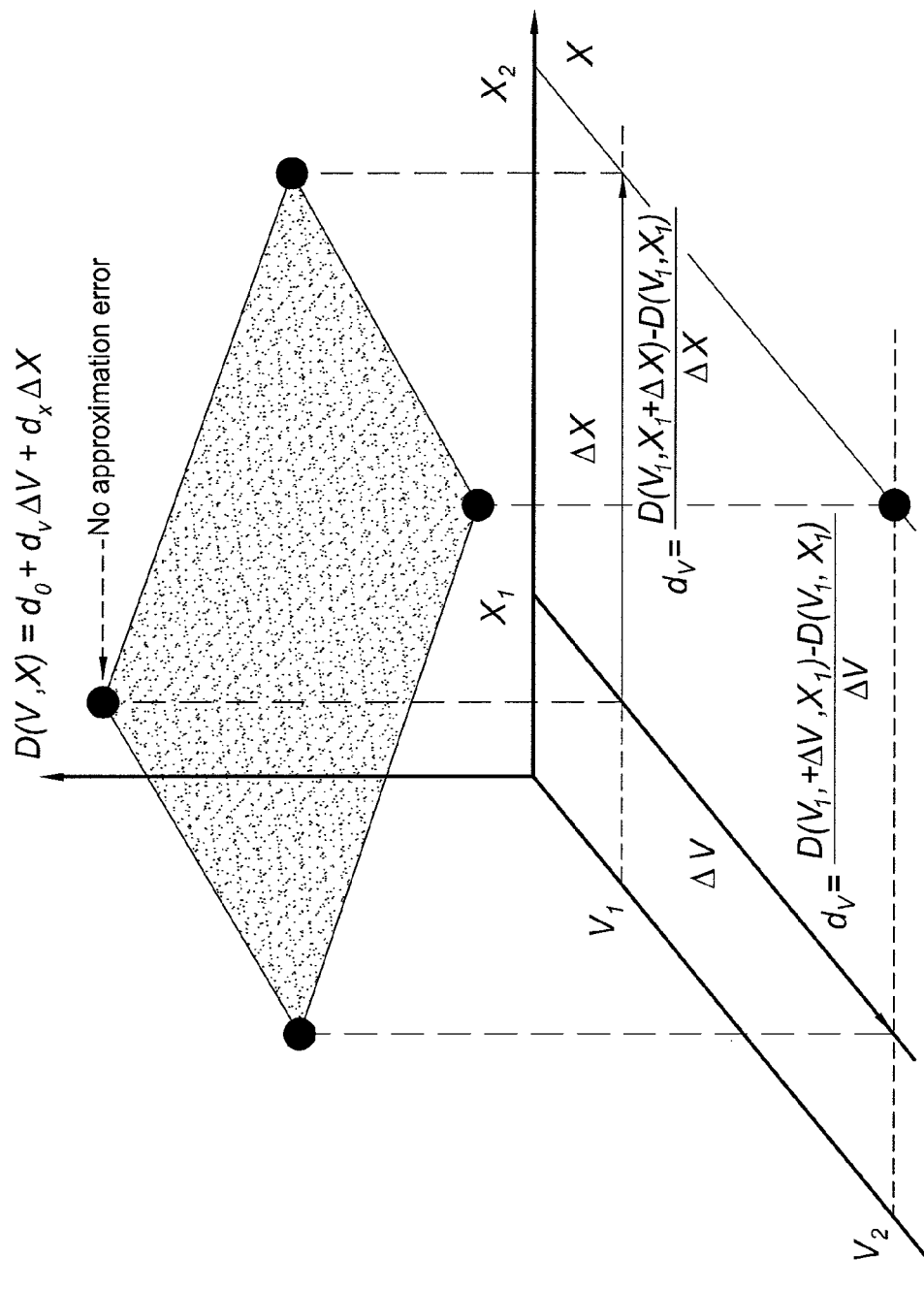
FIG. 1 illustrates the conventional linear approach to modeling timing quantities in statistical timing.
Figure 2:
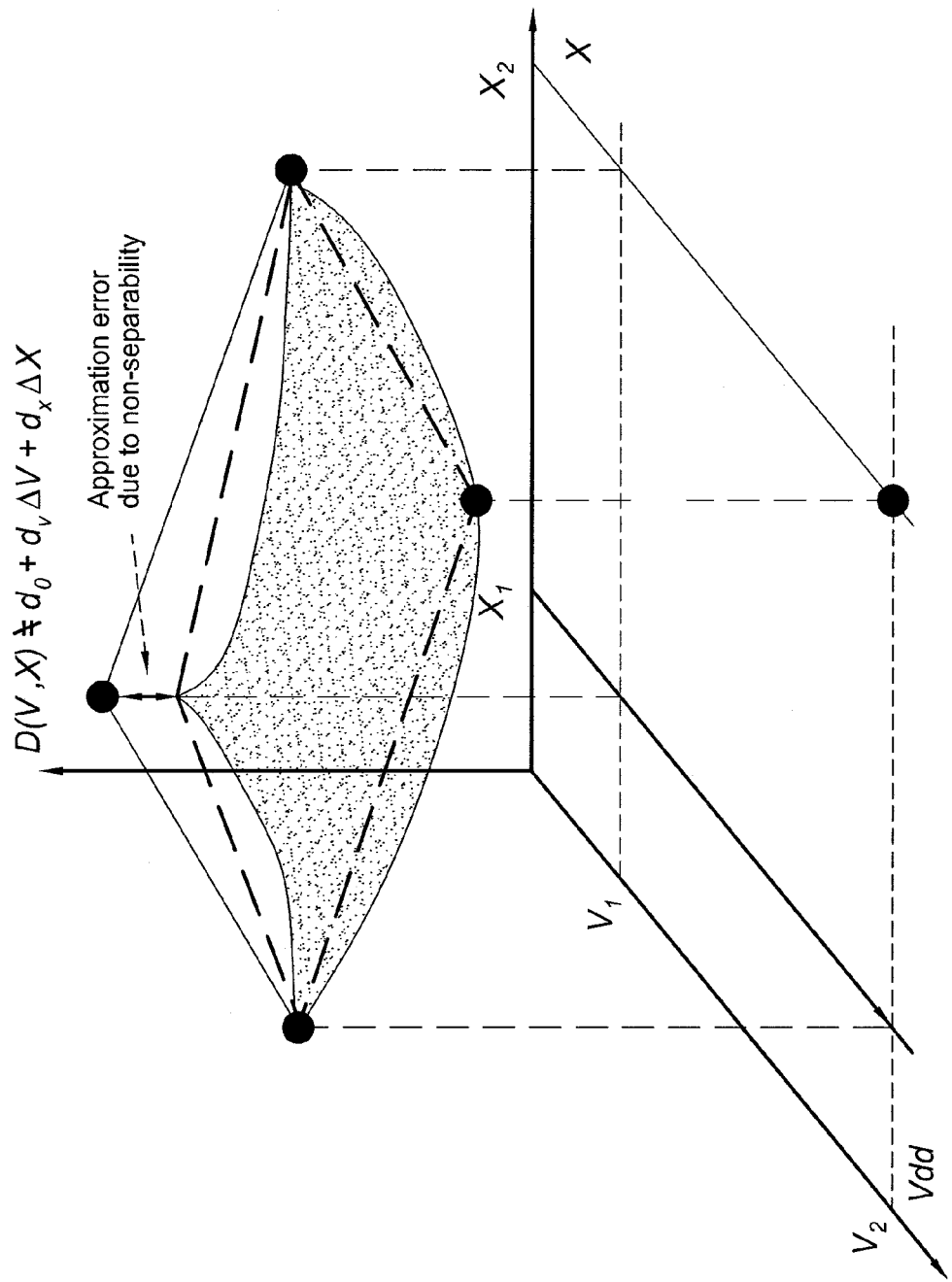
FIG. 2 illustrates the application of the linear approach illustrated in FIG. 1 to modeling timing quantities with non-separable parameters.
Figure 3:
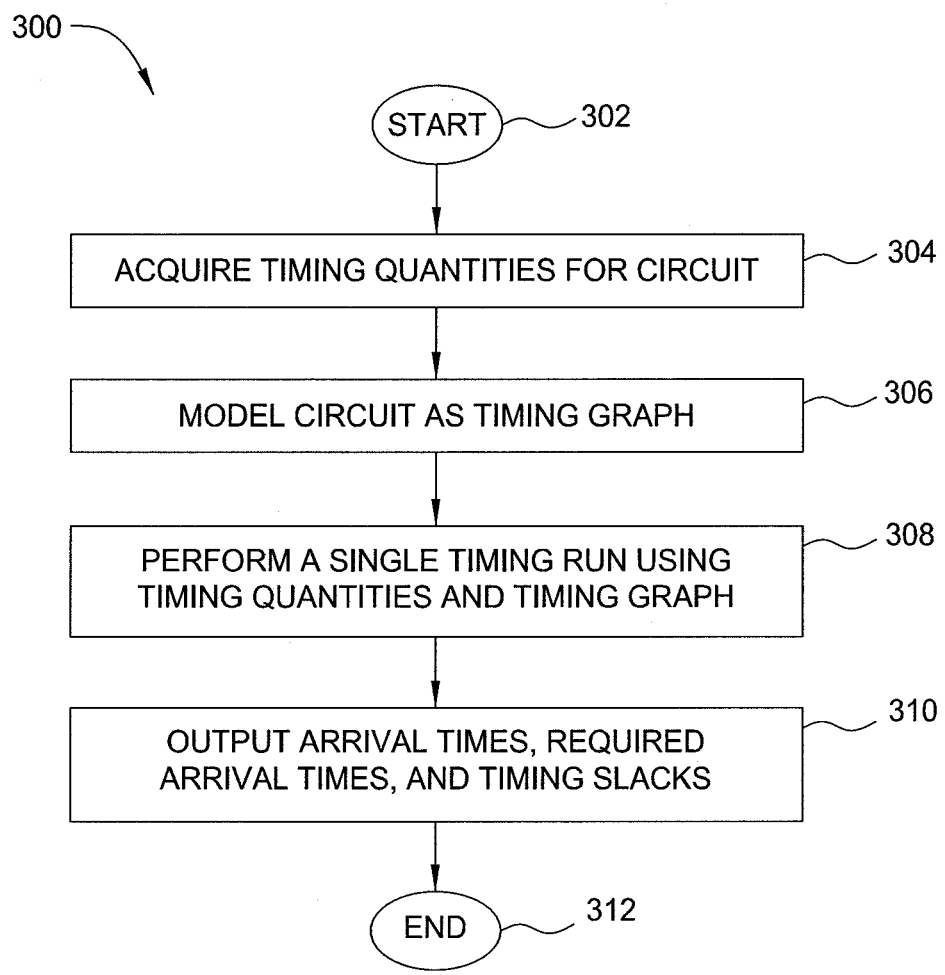
FIG. 3 is a flow diagram illustrating one embodiment of a method for performing statistical timing analysis for a circuit in which the timing quantities are dependent on deterministic, corner-based variables and non-separable statistical process variables, according to the present invention.

FIG. 3 is a flow diagram illustrating one embodiment of a method 300 for performing statistical timing analysis for a circuit in which the timing quantities are dependent on deterministic, corner-based variables and non-separable statistical process variables, according to the present invention.

The method 300 is initialized in step 302 and proceeds to step 304, where the timing quantities of the circuit are acquired. The timing quantities include the delays of the gates and wires and the arrival times at the circuit inputs. In one embodiment, these timing quantities depend on deterministic, corner-based process variables such as supply voltage, temperature, or the like and statistical process variables, some of which are non-separable with the deterministic, corner-based variables. In one embodiment, the interaction of a corner-based parameter with non-separable parameters is modeled using cross-products. In particular, the linear canonical form discussed above is extended by adding: (1) a term for the linear part of the deterministic, corner-based parameter's variation; and (2) a cross-term for each parameter that has a non-separable interaction with the corner-based parameter. Thus, $$t = t_0 + a_x \Delta X + a_y \Delta Y + a_R \Delta R \quad \text{(EQN. 1)}$$

becomes $$t = t_0 + a_V \Delta V + a_x \Delta X + a_{xV} \Delta V \Delta X + a_y \Delta Y + a_{RV} \Delta R \Delta Y + a_R \Delta R \quad \text{(EQN. 2)}$$

where $a_V \Delta V$ is the term for the linear part of the corner-based parameter V's variation, X is a statistical parameter that interacts in a non-separable manner with the corner-based parameter V, $a_{xV} \Delta V \Delta X$ is the cross-term for the non-separable interaction of the corner-based parameter V and the statistical parameter X, Y is a parameter that is separable from the corner-based parameter V, R is an uncorrelated parameter representing random uncertainty, and $a_{RV} \Delta R \Delta Y$ is the cross-term for the non-separable interaction of the corner-based parameter V with the uncorrelated parameter R. Although the letter "V" is commonly used to denote voltage, in the above example V represents a generic deterministic, corner-based parameter. That is, the disclosed invention is applicable to any deterministic, corner-based parameter. As discussed in further detail below, EQN. 2 contains the informational equivalent of two timing runs.

Figure 4:
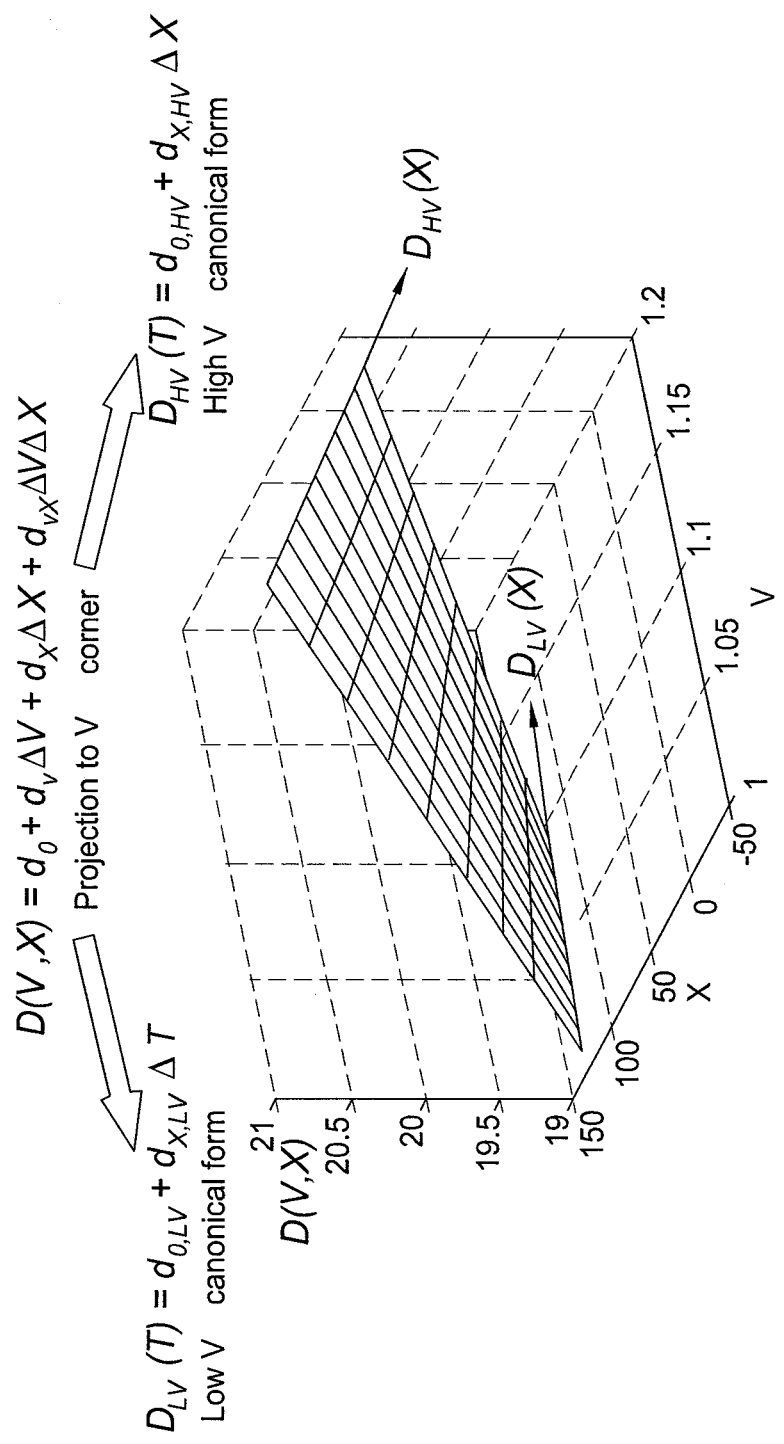
FIG. 4 illustrates the delay for an exemplary chip as a function of two sources of variation that are non-separable.

FIG. 4 illustrates the delay D for an exemplary chip as a function of two sources of variation X and V, where X and V are non-separable. As illustrated, the extended canonical form embodied in EQN. 2 produces a hyperboloid that fits all four process corners exactly. This makes the approximation with the extended canonical form exact at all corners of the deterministic, corner-based variables. Moreover, projecting the value for the corner-based variable V to one of its corners (e.g., LV or HV) turns the extended canonical form into a linear form. Projection to a given corner involves substituting the given corner's value for the corner-based parameter in the extended canonical form. For instance, $D(V,X) = d_0 + d_V \Delta V + d_x \Delta X + d_{VX} \Delta V \Delta X$ becomes $D_{LV}(T) = d_{0,LV} + d_{X,LV} T$ when projected to the low V (i.e., LV) corner and $D_{HV}(T) = d_{0,HV} + d_{X,HV} X$ when projected to the high V (i.e., HV) corner. The corner-based variable can also be projected to any arbitrary value within its corners. The projection turns the extended canonical form into a linear canonical form that is the interpolation of the linear canonical forms corresponding to the high V and low V corners of the projected variable. Linear interpolation between the high and low corners is useful for voltage binning when the corner-based variable is supply voltage. The linear canonical form obtained by projection models statistical variability at the corner of projection. In addition, the mean, uncorrelated random term, and sigma are also computed.

Projection can also be performed to the worst corner (i.e., the corner where the extended canonical form takes its minimum or maximum value). For example, for variables that are separable with the corner-based parameter, the values for substitution are selected according to the signs (i.e., positive or negative) of their sensitivities. For variables that are not separable with the corner-based parameter, the worst corner is selected in two steps. First, the corner-based parameter is set to its lowest value (e.g., $V = V_1$) and the sensitivities to the non-separable variables are computed (e.g., $a_{x,1} = a_x + a_{xV} \Delta V_1$). This includes computing the worst corners for the variables that are not separable with the corner-based parameter V and computing the worst contribution of the corner-based parameter V and the variables that are non-separable with V at the lowest value (e.g., $V = V_1$), taking into account all root square summation settings. Second, the corner-based parameter is set to its highest value (e.g., $V = V_2$) and the sensitivities to the non-separable variables are computed (e.g., $a_{x,2} = a_x + a_{xV} \Delta V_2$). This includes computing the worst corners for the variables that are not separable with the corner-based parameter V and computing the worst contribution of the corner-based parameter V and the variables that are non-separable with V at the highest value (e.g., V=V$_2$), taking into account all root square summation settings. If the linear terms have a greater effect than all of the cross-terms together, then the worst corner can be computed from the signs of the linear sensitivities.

Once the delay is expressed in extended linear canonical form as in EQN. 2, the delay can be computed. In one embodiment, where the delay of a logic gate or wire is known as a function of process and environmental parameters, the extended canonical form of the delay can be computed using finite differencing. Specifically, the cross-terms for delays and slews are computed by finite differencing to the process corners involving variations of the deterministic, corner-based and corresponding non-separable variables simultaneously.

Figure 5:
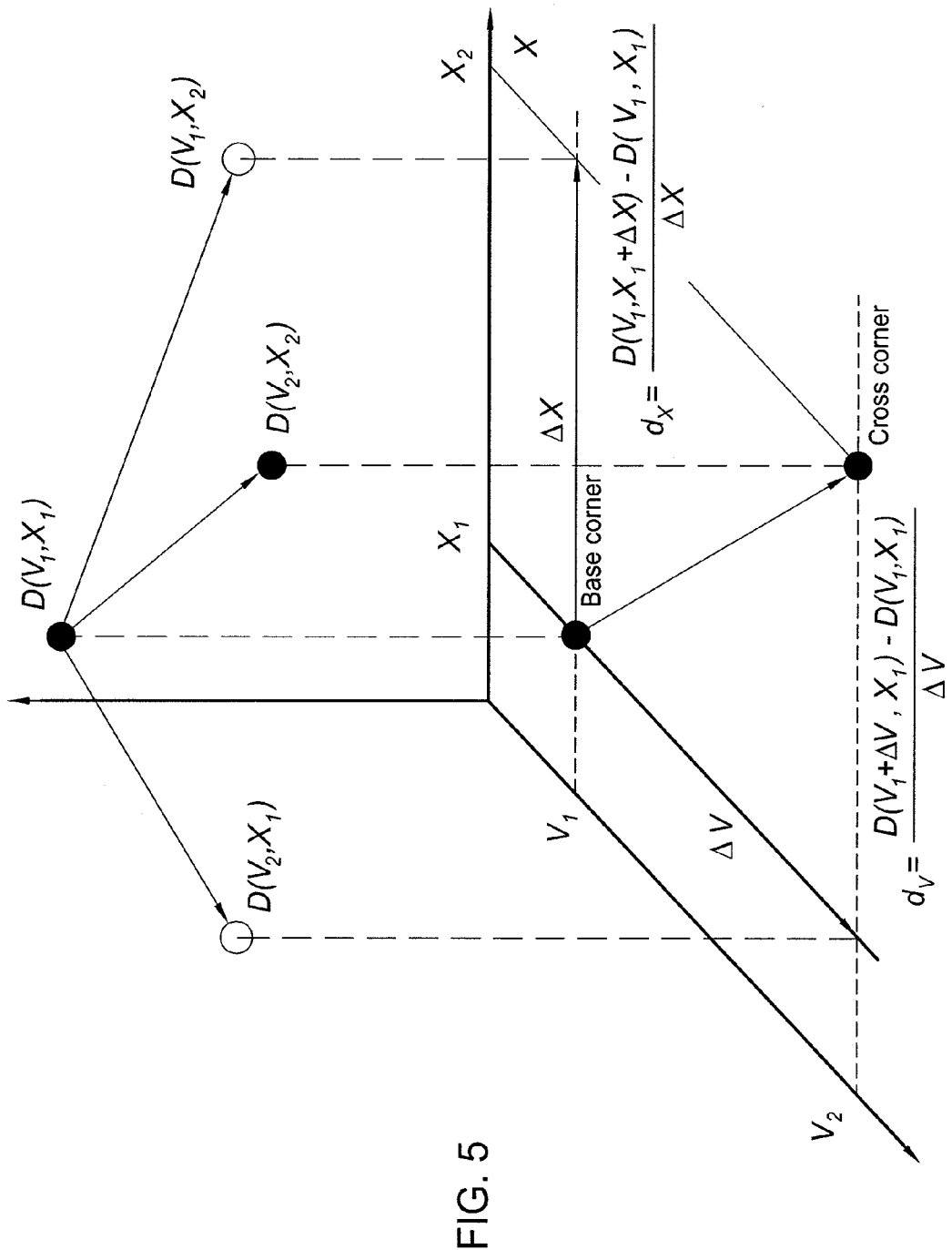
FIG. 5 illustrates the application of finite differencing to computing the extended linear canonical form of EQN. 2.

FIG. 5 illustrates the application of finite differencing to computing the extended linear canonical form of EQN. 2. As illustrated, the linear sensitivities to the parameter X can be computed using finite differencing from the base corner (V$_1$, X$_1$) to the other corner (V$_1$, X$_2$) for the parameter X. Thus, d$_x$:(V$_1$,X$_1$)→(V$_1$,X$_2$). Likewise, the linear sensitivity to the parameter V can be computed using finite differencing from the base corner (V$_1$, X$_1$) to the other corner (V$_2$, X$_1$) for the parameter V. Thus, d$_V$:(V$_1$,X$_1$)→(V$_2$,X$_1$). Finally, sensitivity d$_{VX}$ to the cross term ΔVΔX can be computed using finite differencing from the base corner (V$_1$, X$_1$) to the cross-corner (V$_2$, X$_2$). Thus, d$_{VX}$:(V$_1$,X$_1$)→(V$_2$,X$_2$).

Based on the above, one can compute d$_{VX}$ as:

$$d_{VX} = \frac{D(V_1 + \Delta V, X_1 + \Delta X) - D(V_1, X_1) - d_x \Delta X - d_v \Delta V}{\Delta X \Delta V} \quad \text{(EQN. 3)}$$

$$= \frac{D(V_1 + \Delta V, X_1 + \Delta X) - D(V_1, X_1)}{\Delta X \Delta V} - \frac{d_x}{\Delta V} - \frac{d_v}{\Delta X}$$

where ΔX=X$_2$−X$_1$ and ΔV=V$_2$−V$_1$.

Figure 6:
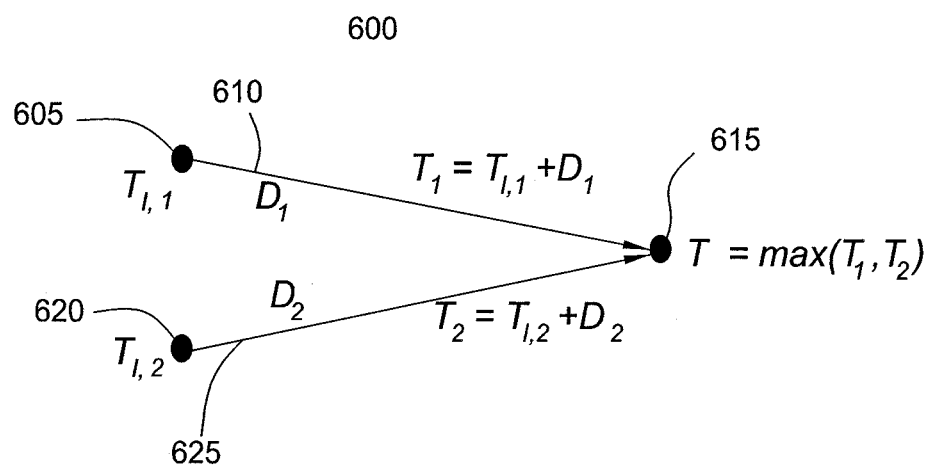
FIG. 6 illustrates propagation of signal arrival times through a portion of an exemplary timing graph.

Referring back to FIG. 3, once the timing quantities are acquired, the method 300 proceeds to step 306, where the circuit is modeled as a timing graph. In one embodiment, the timing graph is a directed acyclic timing graph. The nodes of the timing graph represent the inputs and outputs of the gates, while the edges (timing arcs) of the graph represent the propagation of signals from a gate's input to its output or from a first gate's output to a second gate's input. FIG. 6, for example, illustrates propagation of signal arrival times through a portion of an exemplary timing graph 600 having three nodes 605, 615, and 620 and two edges 610 and 625. The nodes 605 and 620 have arrival times T$_{I,1}$ and T$_{I,2}$, respectively. Timing edges 610 and 625 have delays D$_1$ and D$_2$, respectively. The latest arrival time T at node 615 is computed as the maximum of the arrival time T$_1$=T$_{I,1}$+D$_1$ propagated through edge 610 and the arrival time T$_2$=T$_{I,2}$+D$_2$ propagated through the edge 625.

In step 308, a single timing run is performed using the acquired timing quantities and the timing graph. In one embodiment, a timing run involves two main operations: (1) propagation of the arrival times through the timing edges of the timing graph; and (2) computation of the latest (or earliest) arrival time at the nodes of the timing graph (e.g., MIN or MAX arrival time). The first step (propagation of the arrival times) requires addition of the extended canonical forms of the delays to the extended canonical forms of the arrival times at the nodes of the timing graph. The second step (computation of the arrival time) requires computation of a statistical and deterministic maximum or minimum among a plurality of the extended canonical forms of the arrival times propagated through the timing edges of the timing graph to its nodes.

The addition and subtraction of the extended canonical forms is relatively simple. In general, all sensitivities and all cross-terms, except for the cross-term of the uncorrelated variation, are summed for addition or subtracted for subtraction. Uncorrelated variations are projected to the corners of the corner-based parameter and then root square summed at each corner of the corner-based parameter. In one embodiment, the root sum square is computed at the corners V$_1$ and V2, respectively, as follows:

$$t_R(V_1) = \sqrt{(t_{R,1} + t_{R,V,1}\Delta V_1)^2 + (d_{R,1} + d_{R,V,1}\Delta V_1)^2}$$

$$t_R(V_2) = \sqrt{(t_{R,1} + t_{R,V,1}\Delta V_2)^2 + (d_{R,1} + d_{R,V,1}\Delta V_2)^2} \quad \text{(EQN. 4)}$$

where t$_{R,1}$ and d$_{R,1}$ are the sensitivities to uncorrelated variations of the arrival time and the delay, respectively; t$_{R,V,1}$ and d$_{R,V,1}$ are the cross-term sensitivities to variation of the variable V and uncorrelated variations of the arrival time and the delay, respectively. Them the cross-term of the uncorrelated random variation, t$_{R,V}$, of the resultant extended canonical form is computed as:

$$t_{R,V} = \frac{t_R(V_1) - t_R(V_2)}{V_1 - V_2} \quad \text{(EQN. 5)}$$

The computation of the arrival time at the circuit output, as discussed above, typically involves a statistical MIN or MAX operation. For example, referring again to FIG. 6, the latest arrival time T to the node 615 is calculated as:

$$T = \max(T_1, T_2) \quad \text{(EQN. 6)}$$

where T$_1$ and T$_2$ are the arrival times of the signals propagated through the edges 610 and 625 to the node 615.

Figure 7:
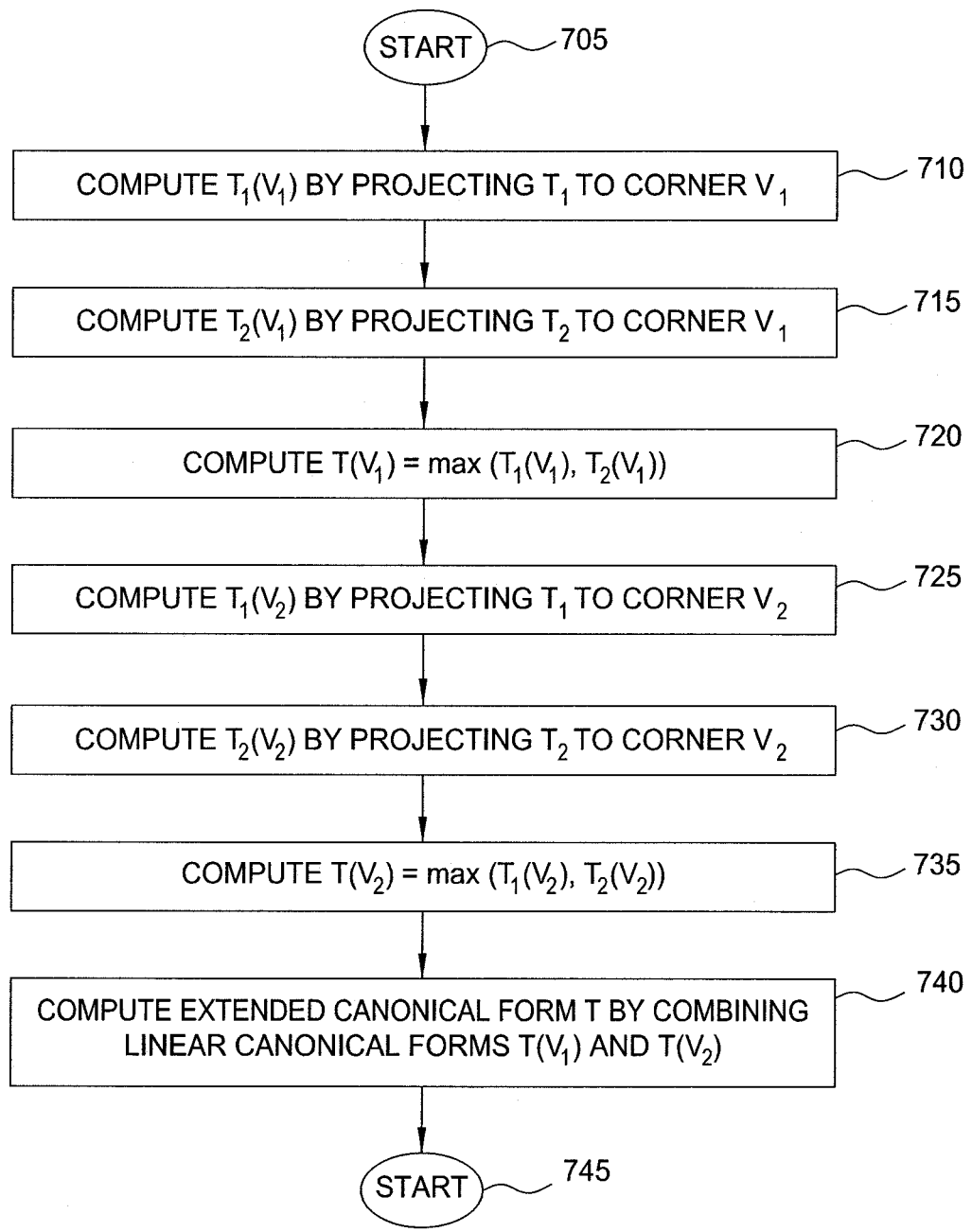
FIG. 7 is a flow diagram illustrating one embodiment of a method for computing a maximum of two extended canonical forms, according to the present invention.

In one embodiment, EQN. 6 is computed by a method illustrated in greater detail with respect to FIG. 7. First, the arrival times T$_1$ and T$_2$ that are propagated through the edges 610 and 625 are projected at each corner of the corner-based parameter V. This produces the linear canonical forms T$_1$(V$_1$), T$_2$(V$_1$), and T$_1$(V$_2$), T$_2$(V$_2$). Next, the statistical maximum is computed at each corner of the corner-based parameter V as:

$$T(V_1) = \max(T_1(V_1), T_2V_1))$$

$$T(V_2) = \max(T_1(V_2), T_2(V_2)) \quad \text{(EQN. 7)}$$

Finally, the resultant simple linear canonical forms T(V$_1$) and T(V$_2$) are combined into an extended canonical form as discussed above.

Referring back to FIG. 3, once the timing run has been performed, the arrival times, required arrival times, and timing slacks of the circuit nodes latches, and outputs are output in step 310. The method 300 then terminates in step 312.

FIG. 7 is a flow diagram illustrating one embodiment of a method 700 for computing a maximum of two extended canonical forms, according to the present invention. For the purposes of illustration the method 700 is described as computing the maximum T of the extended canonical forms T$_1$ and T$_2$.

The method is initialized in step 705 and proceeds to step 710, where the first extended canonical form T$_1$ is projected to the first corner V$_1$ of the corner-based variable V. In step 715, the second extended canonical form T$_2$ is projected to the first corner $V_1$ of the corner-based variable V. The projected canonical forms $T_1(V_1)$ and $T_2(V_1)$ are linear canonical forms.

In step 720, the statistical maximum $T(V_1)$ is computed from the projected linear canonical forms $T_1(V_1)$ and $T_2(V_1)$. In one embodiment, this computation applies the conventional statistical maximum operation. The resultant linear canonical form $T(V_1)$ is the projection of the required extended canonical form T to the first corner $V_1$.

In step 725, the first extended canonical form $T_1$ is projected to the second corner $V_2$ of the corner-based variable V. In step 730, the second extended canonical form $T_2$ is projected to the first corner $V_2$ of the corner-based variable V. The projected canonical forms $T_1(V_2)$ and $T_2(V_2)$ are linear canonical forms.

In step 735, the statistical maximum $T(V_2)$ is computed from the projected linear canonical forms $T_1(V_2)$ and $T_2(V_2)$. In one embodiment, this computation applies the conventional statistical maximum operation. The resultant linear canonical form $T(V_2)$ is the projection of the required extended canonical form T to the first corner $V_2$.

In step 740, the two linear canonical forms of the statistical maximums $T(V_1)$ and $T(V_2)$ are combined to compute the extended canonical form T. In this step, $T(V_1)$ and $T(V_2)$ are projections of T to the first and second corners $V_1$ and $V_2$, respectively. This computation is performed using:

$$t_v = \frac{t_{0,1} - t_{0,2}}{V_1 - V_2} \quad \text{(EQN. 8)}$$

$$t_0 = t_{0,1} + d_V V_1 \quad \text{(EQN. 9)}$$

$$t_{X,V} = \frac{t_{X,1} - t_{X,2}}{V_1 - V_2} \quad \text{(EQN. 10)}$$

$$t_X = t_{X,1} + t_{X,V} V_1 \quad \text{(EQN. 11)}$$

where $t_{0,1}$, $t_{0,2}$, and $t_0$ are the mean values of the linear canonical forms $T(V_1)$ and $T(V_2)$ and the extended canonical form T, respectively; $t_V$ is the sensitivity of the extended canonical form T to the corner-based variable V; $t_{X,1}$ and $t_{X,2}$ are the sensitivities of the linear canonical forms $T(V_1)$ and $T(V_2)$ to the non-separable variable X; and $t_{X,V}$ is the sensitivity of the extended canonical form T to the corner-based variable V and the non-separable variable X.

The method 700 terminates in step 745. The computation of the minimum of two extended canonical forms is performed in a similar manner.

The method 300 (for performing statistical timing with non-separable statistical and deterministic, corner-based variations) improves the accuracy of statistical timing. The method 300 also saves processing time and reduces turn-around time for timing analysis by obtaining the timing information for each corner of a corner-based parameter via projection of the extended canonical forms of the delays, slews, arrival times, required arrival times, timing slacks, and other timing quantities. This approach is convenient for circuit optimization because it provides a single metric to guide optimization. This approach can also compute the worst timing slack for both the corner-based parameter and all statistical parameter variations.

Further applications of the disclosed approach include selective voltage binning. For example, the timing slacks for all voltage bins can be obtained by projection as discussed above. This allows circuit optimization and achieves timing closure for circuits with selective voltage binning.

Moreover, although the invention is discussed within the context of a single corner-based parameter, it may be extended to timing analysis involving multiple corner-based variables. In this case, any deterministic variables (e.g., supply voltage, temperature, or the like) are declared as deterministic, corner-based parameters. Cross-terms are then introduced between all non-separable statistical and deterministic, corner-based variables (memory requirements in this step can be reduced by neglecting high-order cross-terms involving the products of three or more quantities). Operations on the extended canonical forms can also be extended to multiple corner-based variables.

Further embodiments of the invention can be extended to account for the nonlinearity of deterministic, corner-based variables. In this case, quadratic or higher-order terms are introduced into the computation, and a middle range corner for the corner-based parameter is considered in computing the sensitivities to the quadratic or higher-order term.

It is noted that the extended canonical form for the delays and arrival times that is discussed above is related to the corner canonical forms for the corner-based parameters. The corner canonical forms are projections of the extended canonical form to the corners of the deterministic, corner-based parameter. For example, in the equation $t = t_0 + a_V \Delta V + a_x \Delta X + a_{xV} \Delta V \Delta X + a_y \Delta Y + a_{yV} \Delta V \Delta Y + a_z \Delta Z + a_R \Delta R$, the corner canonical forms for the corner-based parameter V can be computed as:

$$t_{\Delta V_1} = \quad \text{(EQN. 12)}$$
$$t_{0,1} + a_{x,1} \Delta X + a_{y,1} \Delta Y + a_{z,1} \Delta Z + a_{R,1} \Delta R = t_0 + a_V \Delta V_1 +$$
$$(a_x + a_{xV} \Delta V_1) \Delta X + (a_y + a_{yV} \Delta V_1) \Delta Y + a_z \Delta Z + a_R \Delta R$$

and $$t_{\Delta V_2} = \quad \text{(EQN. 13)}$$
$$t_{0,2} + a_{x,2} \Delta X + a_{y,2} \Delta Y + a_{z,2} \Delta Z + a_{R,2} \Delta R = t_0 + a_V \Delta V_2 +$$
$$(a_x + a_{xV} \Delta V_2) \Delta X + (a_y + a_{yV} \Delta V_2) \Delta Y + a_z \Delta Z + a_R \Delta R$$

Similarly, the extended canonical form can be projected to any other value of the corner-based parameter.

The extended canonical form uniquely represents the canonical forms at the corners of the corner-based parameter V. That is, the canonical forms for the corners $V=V_1$ and $V=V_2$ are computed from the extended canonical form. Conversely, the extended canonical form of the delay, arrival time, required arrival time, timing slack, or other timing quantity can be computed from the canonical forms at the corners $V=V_1$ and $V=V_2$.

Since a corner-based parameter is a deterministic rather than statistical variable, the corner-based parameter may not be statistically correlated with any variables. For example, supply voltage Vdd is not correlated with any variables and is not a statistical variable. Thus, a correlation matrix will not depend on Vdd. Therefore, the correlated variables are de-correlated by linear transformation. Thus, one has:

$$\begin{pmatrix} \Delta X \\ \Delta Y \end{pmatrix} \Rightarrow \begin{pmatrix} \Delta u_{int,1} \\ \Delta u_{int,2} \end{pmatrix} : \begin{array}{l} u_{int,1} = \alpha_1 \cdot \Delta X + \beta_1 \cdot \Delta Y \\ u_{int,2} = \alpha_2 \cdot \Delta X + \beta_2 \cdot \Delta Y \end{array} \quad \text{(EQN. 14)}$$

The external extended canonical form, $t=t_0+a_V\Delta V+a_x\Delta X+a_{xV}\Delta V\Delta X+a_y\Delta Y+a_{yV}\Delta V\Delta Y+a_z\Delta Z+a_R\Delta R$, is thus transformed into internal extended canonical form as:

$$t=t_0+a_V\Delta V+a_{int,1}\Delta u_{int,1}+a_{int,V,1}\Delta V\Delta u_{int,1}+a_y\Delta u_{int,2}+a_{int,V,2}\Delta V\Delta u_{int,2}+a_z\Delta Z+a_R\Delta R \quad \text{(EQN. 15)}$$

The sensitivities to cross terms in EQN. 15 are computed by the same linear transformation as the linear sensitivities to the corresponding variables. This follows from the fact that the variables X and Y are transformed linearly.

Figure 8:
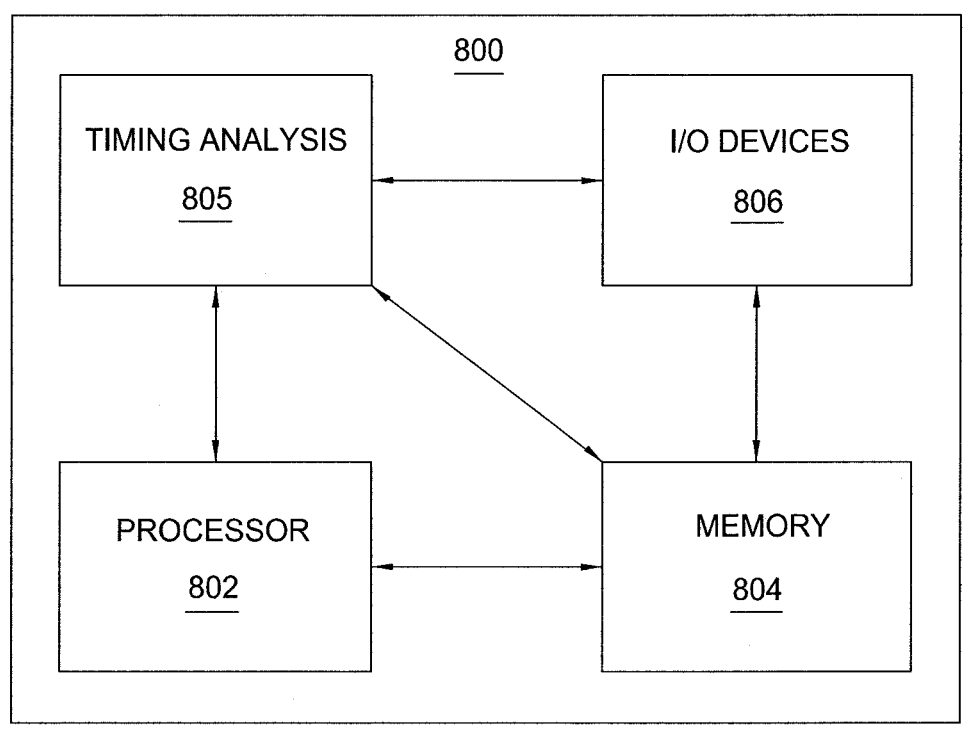
FIG. 8 is a high-level block diagram of timing analysis method that is implemented using a general purpose computing device.

FIG. 8 is a high-level block diagram of timing analysis method that is implemented using a general purpose computing device 800. In one embodiment, a general purpose computing device 800 comprises a processor 802, a memory 804, a timing analysis module 805 and various input/output (I/O) devices 806 such as a display, a keyboard, a mouse, a stylus, a wireless network access card, and the like. In one embodiment, at least one I/O device is a storage device (e.g., a disk drive, an optical disk drive, a floppy disk drive, a path selection tool, and/or a test pattern generation tool). It should be understood that the timing analysis module 805 can be implemented as a physical device or subsystem that is coupled to a processor through a communication channel.

Alternatively, the timing analysis module 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Thus, in one embodiment, the timing analysis module 805 for performing statistical timing analysis with non-separable statistical and deterministic variations, as described herein with reference to the preceding Figures, can be stored on a non-transitory computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for performing timing analysis of an integrated circuit chip, the method comprising:
    computing a timing quantity of the integrated circuit chip as a function of a first process parameter that is deterministic and corner-based and a second process parameter that is non-separable with the first process parameter, wherein a form of the timing quantity contains an informational equivalent of multiple timing runs; and
    performing a single timing run using the timing quantity and accounting for both the first process parameter and the second process parameter, wherein the single timing run produces an arrival time, a required arrival time, or a timing slack at a node of the integrated circuit chip,
    wherein at least one of: the extending or the performing is performed using a processor.

2. The method of claim 1, wherein the timing quantity is a delay or a signal slew of a gate or wire in the integrated circuit chip.

3. The method of claim 1, wherein the timing quantity is an arrival time at the input of the integrated circuit chip or a required arrival time at an output of the integrated circuit chip.

4. The method of claim 1 wherein the computing comprises:
    extending a linear canonical form of the timing quantity to account for an interaction of the first process parameter with the second process parameter; and
    projecting a value for the first process parameter to a corner associated with the first process parameter; and
    calculating the timing quantity in accordance with the linear canonical form, after the projecting.

5. The method of claim 4, wherein the extending comprises:
    modeling a linear portion of a variation of the first processing parameter; and
    modeling the interaction of the first process parameter with the second process parameter as a cross-product.

6. The method of claim 5, wherein the calculating comprises:
    computing a sensitivity to the cross-product using finite differencing.

7. The method of claim 6, wherein the finite differencing is performed for each process corner that involves a variation of the first process parameter and the second process parameter simultaneously.

8. The method of claim 6, wherein the computing the sensitivity comprises:
    modeling the interaction of the first process parameter with the second process parameter as a quadratic or higher-order term, where the first process parameter is non-linear; and
    computing a sensitivity to the quadratic or higher-order term in accordance with a middle range corner for the first process parameter.

9. The method of claim 5, wherein the calculating comprises:
    assigning the sensitivity assuming a known percentage of variability.

10. The method of claim 4, wherein the projecting comprises:
    substituting a value associated with the corner for the first process parameter in the linear canonical form that is extended.

11. The method of claim 4, wherein the projecting comprises:
    substituting a value associated with a first corner for the first process parameter in a first version the linear canonical form that is extended, wherein the first corner is associated with a lowest value for the first process parameter; and
    substituting a value associated with a second corner for the first process parameter in a second version the linear canonical form that is extended, wherein the second corner is associated with a highest value for the first process parameter.

12. The method of claim 11, further comprising:
performing linear interpolation between the first version the linear canonical form that is extended and the second version the linear canonical form that is extended.

13. The method of claim 4, wherein the method further comprises:
modeling the integrated circuit chip as a timing graph, wherein each node in the timing graph represents an input or an output of a gate in the integrated circuit chip and each edge in the timing graph represents a propagation of a signal in the integrated circuit chip.

14. The method of claim 13, wherein the performing comprises:
propagating the timing quantity through the timing graph; and
computing an arrival time at the node of the integrated circuit chip, in accordance with the timing quantity as propagated.

15. The method of claim 14, wherein the propagating comprises:
adding the linear canonical form of the timing quantity, as extended, and an extended linear canonical form of at least one more timing quantity.

16. The method of claim 15, wherein the adding comprises:
summing all sensitivities and cross-products in the linear canonical form of the timing quantity, as extended, and the extended linear canonical form of the at least one more timing quantity.

17. The method of claim 14, wherein the arrival time is a statistical minimum or a statistical maximum among all arrival times at the node of the integrated circuit chip.

18. The method of claim 14, wherein the computing comprises:
projecting an arrival time on an input edge of the node of the integrated circuit chip at each corner associated with the first process parameter, to produce a plurality of quantities;
computing a statistical maximum or a statistical minimum among the plurality of quantities at each corner associated with the first process parameter, to produce a simple canonical form at each corner associated with the first process parameter; and
combining the simple canonical form for each corner associated with the first process parameter to produce an extended canonical form.

19. The method of claim 1, wherein the arrival time is used in a circuit optimization process.

20. The method of claim 1, wherein the arrival time is used in a sign-off timing process.

21. The method of claim 1, wherein the arrival time is used in a selective voltage binning process.

22. The method of claim 1, wherein the first process parameter is supply voltage.

23. The method of claim 1, wherein the first process parameter is temperature.

24. A computer readable storage medium device containing an executable program for performing timing analysis of an integrated circuit chip, where the program performs steps of:
computing a timing quantity of the integrated circuit chip as function of a first process parameter that is deterministic and corner-based and a second process parameter that is non-separable with the first process parameter, wherein a form of the timing quantity contains an informational equivalent of multiple timing runs; and
performing a single timing run using the timing quantity and accounting for both the first process parameter and the second process parameter, wherein the single timing run produces an arrival time, a required arrival time, or a timing slack at a node of the integrated circuit chip.

25. Apparatus for performing timing analysis of an integrated circuit chip, the apparatus comprising:
means for computing a timing quantity of the integrated circuit chip as a function of a first process parameter that is deterministic and corner-based and a second process parameter that is non-separable with the first process parameter, wherein a form of the timing quantity contains an informational equivalent of multiple timing runs; and
means for performing a single timing run using the timing quantity and accounting for both the first process parameter and the second process parameter, wherein the single timing run produces an arrival time, a required arrival time, or a timing slack at a node of the integrated circuit chip.

* * * * *